(12) United States Patent
Semann

(10) Patent No.: US 11,895,561 B2
(45) Date of Patent: Feb. 6, 2024

(54) METHOD OF AND SYSTEM FOR LOCALIZING A DEVICE WITHIN AN ENVIRONMENT

(71) Applicant: Airbus Defence and Space GmbH, Taufkirchen (DE)

(72) Inventor: Mika Semann, Taufkirchen (DE)

(73) Assignee: Airbus Defence and Space GmbH

( * ) Notice: Subject to any disclaimer, the term of this patent is extended or adjusted under 35 U.S.C. 154(b) by 295 days.

(21) Appl. No.: 17/237,188

(22) Filed: Apr. 22, 2021

(65) Prior Publication Data
US 2021/0337356 A1 Oct. 28, 2021

(30) Foreign Application Priority Data
Apr. 28, 2020 (EP) .................................... 20171908

(51) Int. Cl.
| | |
|---|---|
| *H04W 4/02* | (2018.01) |
| *H04W 4/029* | (2018.01) |
| *G06N 20/00* | (2019.01) |
| *G06N 5/02* | (2023.01) |
| *G01S 19/48* | (2010.01) |

(52) U.S. Cl.
CPC .............. *H04W 4/029* (2018.02); *G06N 5/02* (2013.01); *G06N 20/00* (2019.01); *G01S 19/48* (2013.01)

(58) Field of Classification Search
CPC .......... H04W 4/029; G06N 20/00; G06N 5/02
See application file for complete search history.

(56) References Cited

U.S. PATENT DOCUMENTS

| | | | |
|---|---|---|---|
| 9,002,373 B2 | 4/2015 | Marti et al. | |
| 9,832,604 B1* | 11/2017 | Ray .......................... | H04W 4/02 |
| 2006/0232472 A1 | 10/2006 | Roslak | |
| 2012/0083286 A1 | 4/2012 | Kim et al. | |
| 2013/0079033 A1 | 3/2013 | Gupta et al. | |
| 2013/0124081 A1 | 5/2013 | Khosravy et al. | |
| 2014/0350753 A1 | 11/2014 | Depape et al. | |
| 2016/0188996 A1* | 6/2016 | Modica ................... | G06F 16/50 |
| | | | 382/203 |

FOREIGN PATENT DOCUMENTS

WO 2017216058 A1 12/2017

OTHER PUBLICATIONS

Extended European Search Report including Written Opinion for EP20171908.5 dated Oct. 12, 2020; 9 pages.

\* cited by examiner

*Primary Examiner* — Curtis B Odom
(74) *Attorney, Agent, or Firm* — Lerner David LLP

(57) ABSTRACT

A method of localizing a device within an environment includes a step, in which a first location information is acquired that is representative of a first specified position. In another step, a first sensor information is acquired that is representative of the first specified position. In another step, the first sensor information is allocated to the first location information in order to generate a first condition information that is unique for the first specified position. In another step, a knowledge base is provided which includes the first condition information. In another step, the device provides a current sensor information indicating a current condition of the environment present at the current position of the device. In another step, the device is localized based on a matching between the current sensor information and the plurality of condition information.

14 Claims, 3 Drawing Sheets

METHOD OF AND SYSTEM FOR LOCALIZING A DEVICE WITHIN AN ENVIRONMENT

FIELD OF THE INVENTION

The invention relates to localization techniques for devices in an environment. In particular, the invention relates to a method of localizing a device within an environment as well as a system for localizing a device within an environment

BACKGROUND OF THE INVENTION

Positioning, navigation and tracking systems are frequently used and indispensable in nowadays mobility. Commonly, such systems are usually based on different GNSS or satellite-based positioning and navigation systems like Galileo, Navstar, GPS (Global Positioning System) or GLONASS (Global Navigation Satellite System). In most applications, these systems may deliver accurate information for a current location of a mobile device. Such mobile devices may include vehicles like aircraft, ground vehicles, water vehicles or hybrid vehicles. Furthermore, such mobile devices may also include handheld devices that can be carried by a user like, for example mobile phones, tablets, personal digital assistants, etc. However, these systems widely depend on a currently present signal of a minimum quality that is the basis for receiving the required positioning and navigation data from the above-mentioned positioning and navigation systems. Sometimes, the signal quality decreases such that an accurate positioning and navigation becomes impossible. The growing interest in autonomy in traffic systems whether on air, on ground or on the water causes a strong need for robust positioning and navigation systems especially as fallback solution for GNSS (Global Navigation Satellite System)-based systems which are likely to get spoofed or jammed and can also show inaccuracies due to natural phenomena like sun storms or atmospheric disturbances (space weather).

US 2014/0 350 753 A1 describes a system including at least one global navigation database including data for aerial navigation and airport navigation of the aircraft and data mentioned on navigation maps, a central unit for carrying out a contextualized filtering of data intended for a display and received, at least in part, from said navigation database, and a display device for carrying out the display on one and the same screen, said display being based on information from said contextualized filtering.

WO 2017/216 058 A1 describes a method of transmitting a navigation message, a transmitter for transmitting a navigation message, a method of receiving a navigation message and a receiver for receiving a navigation message.

BRIEF SUMMARY OF THE INVENTION

An aspect of the invention may relate to improve the reliability of localizing a device within an environment.

According to an aspect of the invention, a method of localizing a device within an environment is provided. In a step of the method, a first location information is acquired that is representative for a first specified position within the environment. In another step, a first sensor information is acquired that is representative for the first specified position within the environment. In another step, the acquired first sensor information is allocated to the acquired first location information in order to generate a first condition information that is unique or representative for the first specified position within the environment. In another step, a knowledge base is provided, wherein the knowledge base has stored therein a plurality of condition information comprising at least the first condition information. In another step, the device provides a current sensor information indicating a current condition of the environment present or at least achievable at the current position of the device. In another step, the device is localized within the environment based on a matching between the current sensor information that indicates the current condition of the environment and the plurality of condition information stored in the knowledge base.

An aspect of the invention provides an enhanced and accurate localizing, positioning and navigating of devices, in particular mobile devices, within an environment. Therefore, an aspect of the inventive method may provide for an acquisition of sufficient sensor information to distinctively describe a plurality of different specified positions within the environment. In other words, the method provides for a data acquisition process in which a first sensor information, which may include multiple sensor values, is obtained or detected at the first specified position, wherein the first sensor information describes measurable characteristics of that first specified position such that a sensor-based description of the specified position can be established. This sensor information is then allocated to the first location information, for example geographical or spatial coordinates indicative of the first specified position, such that the first specified position, e.g. a first location in the environment, can be distinctively described by the first senor information. Thus, the location information may be used to assign the first sensor information to the specified position within the environment such that a first condition information is obtained that is descriptive and/or unique of the environment at that first specified position of the environment.

This means that different sensor information is combined with a location information such that a distinct description of every single place or each location in the environment can be provided.

In the same manner, a plurality of different specified positions in the environment can be described by a respective uniquely assigned condition information, wherein each specified position in the environment may be assigned to a single condition information that is descriptive of the respective specified position.

The description of the respective specified position may include a data set including each of the sensor information obtained at a respective position in the environment. It is possible that sensor information at a specified position in the environment is acquired, i.e. collected, until that specified position can be uniquely described and thus distinguished against other specified positions in the environment. This is, the description of the specified position may be unambiguous in that there may be no different positions in the environment having the same description, i.e. condition information.

The condition information may describe a state and/or a characteristic of the specified position, for example visible information or non-visible information at that specified position. The visible information and/or the non-visible information may comprise man-made or natural phenomena. For example, visible information may include an appearance of an object or medium, in particular type, color, geometry, dimensions, opacity, etc. Non-visible information may include temperature, radiation, radio signals, humidity, odor, etc. All this information may be provided by the acquired sensor information.

After collecting the first condition information and further condition information in the knowledge base, a digital or electronic map comprising the multiple condition information can be generated, wherein each position in the digital or electronic map may have one single assigned condition information that uniquely describes the respective specified position in the environment. The generated digital or electronic map may thus be a multi-dimensional electronic map that assigns, in a database, multiple sensor values to each one of the specified positions in the environment. In other words, each distinct location in the environment may be described by way of multiple dimensions using the electronic map. The electronic map may include a plurality of different layers which in turn comprise the stored condition information, i.e., the sensor information allocated to the location information. It is possible that each layer in the electronic map is assigned to a specific sensor type. The values of a first sensor type may thus be stored in a first layer of the electronic map, whereas the values of a second sensor type may be stored in a second layer of the electronic map, and so on.

An aspect of the inventive method is thus based on a multi-dimensional electronical map, i.e. knowledge base, which describes the earth surfaces or parts of it in respect to several recorded man-made and/or natural features or phenomena like earth magnetic field, visual topography including buildings, radio signals (or signals of opportunity), etc. A time and/or season information may be added as another dimension comprised by the condition information since some features might be time depending, for example brightness of a specified position during a specified time of the day or season.

The first sensor information may be obtained within a specified radius around the device, i.e., also from remote man-made or natural phenomena. For example, the first sensor information may be obtained within a radius of a maximum of 1 km, a maximum of 10 km, a maximum of 20 km, a maximum of 50 km or a maximum of 100 km, which may depend on the sensor type. For example, if an image sensor is used, the radius in which the first sensor information can be achieved may be at most 50 km, whereas, if a laser sensor is used, the radius in which the first sensor information can be achieved may be at most 1 km.

The combination of these features is unique or representative for every location on earth or an area like a city and can be used for a robust localization of the device if the measured current condition information, i.e. current sensor information obtained by the device, is compared with the knowledge base, i.e. the multi-dimensional map, and a matching between the current condition with a stored condition information in the knowledge base is found. An inertial navigation system may additionally be used to reduce the effort and avoid ambiguities for matching the values measured with those ones in the multi-dimensional map or knowledge base.

The condition information stored in the knowledge base may be obtained during an initial data acquisition process. For example, a mobile device like an aircraft, a ground vehicle, a water vehicle or combinations thereof may carry out the initial data acquisition process. During this initial data acquisition process, an initial knowledge base including an initial multi-dimensional electronic map is build up. This may be done in an initial measuring campaign, e.g. using GNSS and/or other means for geolocating/geocoding the measurements and sensor data which cover the area of interest within the environment in a preferably gap free manner. In case of GNSS, the integrity of the signals may be monitored to ensure a high confidence level in the geocoding, i.e. the multi-dimensional map may only be built if the GNSS signal was reliable. Therefore, a reliability threshold value may be provided which must be exceeded to store a condition information in the knowledge base. The measurements which are preferably done using high end sensors may then be stored on the data acquisition vehicle, e.g. a UAV, and then post-processed on ground, e.g. in a stationary facility, in order to provide the knowledge base.

The environment within which the sensor information and location information is acquired during the initial data acquisition process may be a three-dimensional region on, above, or below an earth's surface including an underwater region. For example, the environment may be a landscape, an urban area, a metropolitan area, a water surface or an air space above the ground of the earth's surface.

In a subsequent localization process of the device, after the knowledge base has been established, it may be uploaded and used on-board the device for its localization, positioning and navigation in the measured area the device is currently located in, i.e. the data from the knowledge base is transferred to the device and may then be compared to the measurements of the individual device in real-time. Alternatively, if the knowledge base is stored in a stationary facility or ground station, the device may send a request which may include the measurements of a given area within the environment to the ground station where the matching is done and the result, i.e. the positioning information or navigation instructions, is uplinked to the device.

Different to a conventional, e.g., GNSS-based, localization, the inventive approach might not provide a single and distinct position with a known error, but each individual sensor together with the knowledge base may provide an area with a known or unknown probability with which the device is located at one or more locations inside this area. By intersecting different areas, a more precise and, specifically, a robust position is obtained. This means, the combination of the information from the device sensors with the condition information from the knowledge base provides different areas that are referenced to different probabilities, wherein each of the different probabilities is indicative of a probability with which the device is located in a respective one of the different areas. The provision of several areas being referenced to a respective probability improves the robustness of localization of the device in the environment. The more areas are provided, the higher the accuracy with which the position of the device can be determined.

The device to be localized using the inventive method may be a mobile device. For example, the device may be a vehicle such as an aircraft, a watercraft, a ground vehicle, a combination thereof, etc. The device may also be a handheld device such as a mobile phone, a tablet computer, a personal digital assistant, etc.

The environment within which the device is localized may be a three-dimensional region on or above an earth's surface, for example a landscape, an urban area, a metropolitan area, a water surface or an air space above the ground of the earth's surface. However, a three-dimensional region below the earth's surface, like underground regions or underwater regions, is also a possible environment within which the device is localized.

In a step of the inventive method, which may be carried out during the localization process, a current sensor information indicating a current condition of the environment present or at least achievable at the current position of the device is provided. This means that the current sensor information may be obtained within a specified radius around the device, i.e., also from remote man-made or natural phenomena. For example, the current sensor information may be obtained within a radius of a maximum of 1 km, a maximum of 10 km, a maximum of 20 km, a maximum of 50 km or a maximum of 100 km, which may depend on the sensor type. For example, if an image sensor is used, the radius in which the current sensor information can be achieved may be at most 50 km, whereas, if a laser sensor is used, the radius from in the current sensor information can be achieved may be at most 1 km.

A sensor unit or sensors of the device which obtain the first sensor information as well as the sensor unit or sensors of the device which obtain the current sensor information may include passive or active sensors which acquire the sensor information from man-made and/or natural phenomena.

According to an embodiment, the plurality of condition information stored in the knowledge base is provided by allocating a plurality of sensor information to a plurality of respective location information, wherein each one of the plurality of condition information is unique or representative for a respective specified position within the environment.

This enables the provision of a multi-dimensional electronic map which includes a stored distinct condition information at every single stored location on the (virtual) multi-dimensional electronic map, wherein each of the stored locations on the map represents a respective specified position in the (real) environment where a current condition or sensor information that matches the stored distinct condition information of the map can be sensed by the device for localization.

For example, in case more than one of the plurality of condition information is present for a respective specified position within the environment, then an ambiguity might occur which may require further restriction data, for example further sensor information or a plausibility check or a probability check allowing an unambiguous allocation of the condition information to a respective specified position within the environment.

According to an embodiment, at least one sensor information is allocated to each one of the plurality of acquired location information, wherein the at least one sensor information and the allocated location information are representative for a respective one of a plurality of specified positions in the environment.

For example, the first sensor information is allocated to the first location information to obtain the first condition information that is representative for the respective first specified position in the environment. Accordingly, second sensor information is allocated to a second location information to obtain a second condition information that is representative for a respective second specified position in the environment. Accordingly, third sensor information is allocated to a third location information to obtain a third condition information that is representative for a respective third specified position in the environment, and so on.

It is noted that the sensor information may include multiple sensor values suitable for distinctively describing the respective specified position within the environment.

According to an embodiment, the first location information is acquired using data from a satellite navigation system.

The data from the satellite navigation system may be provided during the data acquisition process to generate the knowledge base. However, such data from a satellite navigation system may be dispensed with during the localization process of the device within the environment as this localization of the device may only be based on the current sensor information from the device which are matched to the condition information in the knowledge base. In other words, a further localization using a satellite navigation system or another external localization help is not required anymore. Merely, the knowledge base is required to localize and navigate the device. This means that the localization of the device may be carried out even without using a coordinate-based geocoding. Rather, the location and navigation instructions can be based on the multi-dimensional map only, i.e. by using the combination of the different currently measured features or phenomena as a description of a location without the need to use coordinates. For example, the localization indicated to the user of the device may include the following instruction: "at the blue building turn to north until you hear the ocean". In particular, no coordinates may be necessary for localization and navigation, instead merely descriptive data describing the specified position in the environment.

The current sensor information may be present at a specified region and/or feature in the environment. For example, the current sensor information may be obtained at only a single point in the environment, but also within or along certain spatially extended regions and/or features in the environment. Such spatially extended regions and/or features in the environment may comprise an extended line, an extended area or an extended three-dimensional space around the device sensor unit. Therefore, the current sensor information may be obtained along a certain feature extension.

For example, the sensor unit may obtain a sensor value in one extended region which provides a navigation instruction to the user until a second sensor value is obtained providing the user with another navigation instruction. In other words, a first navigation instruction is provided to the user as long as a first sensor information can be obtained within an extended region and/or until a second sensor information, for example from a further extended region, can obtained by the sensor unit. A change in the navigation instruction, i.e., a second navigation instructions, may thus be initiated and provided to the user as soon as the second sensor information is added to or overlaps the first sensor information, i.e., after the user with the device has traveled a certain distance.

This approach can be divided into two or more steps. For example, a first navigation instruction is provided to the user using a navigation information from an inertial system for coarse-determining a direction in which the device should navigate and a second navigation instruction may then be based on a fine-determination of a direction in which the device should navigate, wherein the fine-determination may be based on sensor values from exact points or spatially extended regions in the environment as described above. In addition or alternatively, a waypoint may be determined which is then approximated in a coarse-determination to provide an approximate position of the device. The approximated waypoint may then be used for a fine-determination of a direction in which the device should navigate, wherein the fine-determination may be based on the sensor values.

A navigation system or other external localization help may be added for the localization of the device such that localizing the device within the environment is based on a matching between the current sensor information and the plurality of condition information stored in the knowledge base and furthermore based on provided information or coordinates from, for example, a satellite navigation system.

In a further example, the inventive method may also be used to verify an existing navigation system, for example a GNSS.

A "navigation" of the device in the context of the present invention may be based on a determination of expected sensor information, i.e., expected combined or individual sensor values, at a position in the environment that the vehicle will reach during movement within the environment.

According to an embodiment, a first reliability value is provided that is indicative of a reliability with which the acquired first sensor information factually corresponds to the acquired first location information, wherein the acquired first sensor information is allocated to the acquired first location information only if the first reliability value exceeds a reliability threshold value.

The provision of a reliability value may be carried out for every sensor information that is to be allocated to a respective location information in order to generate the respective condition information before storing the condition information in the knowledge base. To determine the reliability value, a further sensor information or dimension, for example from an inertial navigation system, may be used.

According to an embodiment, a probability value is provided, wherein the probability value is indicative of a probability with which the current sensor information matches one of the plurality of condition information stored in the knowledge base.

It is possible that a probability threshold value is provided. If a determined probability value is lower than the probability threshold value, then the current sensor information is considered not to match a respective condition information stored in the knowledge base and the current sensor information is matched with further ones of the plurality of condition information stored in the knowledge base. If the probability value is equal or larger than the probability threshold value, then the current sensor information is considered as matching the respective one of the plurality of condition information stored in the knowledge base. In other words, the matching is carried out until a sufficient probability is achieved that the measured current sensor information obtained by the device matches one of the condition information stored in the knowledge base such that a secure determination of the location of the device can be carried out.

The result of this might not be a precise position of the device. The result may also be an area, in which the device is present with a certain probability. In an example, a probability distribution may be provided which represents different probability values for the determination of the location of the device considering the type and/or quality of sensor information for example.

According to an embodiment, the first sensor information comprises a qualitative sensor information and a quantitative sensor information, wherein the quantitative sensor information is allocated to the qualitative sensor information.

This means that, for example, a radio signal may be detected which represents the qualitative sensor information and, in addition, a strength of the radio signal may also be detected which represents the quantitative sensor information. Thus, it is possible that the first sensor information always includes both a qualitative component which indicates a presence of a feature or phenomenon in the environment and a qualitative component which indicates an amount or strength with which the feature or phenomenon is present.

It is noted that the qualitative sensor information may be multi-dimensional in that a plurality of qualitative sensor values is provided or combined.

Furthermore, the qualitative and/or quantitative sensor information may be time dependent. In particular, the qualitative and/or quantitative sensor information may be obtained and referenced to a time value, for example indicating a time of the day or a time of the year, etc.

According to an embodiment, the first condition information is representative for an appearance of an object, wherein the appearance of the object is unique for the first specified position within the environment.

The object may be a stationary object. For example, the object may be a building having unique characterizing features, i.e. condition information, wherein no other building with the same characterizing features, i.e. condition information, may be stored in the knowledge base. In this manner, it is possible to uniquely assign each condition information to a specified position within the environment. In other words, the knowledge base is generated such that a storing of two identical condition information for two different positions in the environment is avoided. It is possible that, if two identical condition information are in the course to be stored in the knowledge base, an automatic request may be provided to acquire further sensor information until sufficient sensor information is available to clearly distinguish the two condition information. A storing of two identical condition in formation for two different specified positions may thus be prohibited.

According to an embodiment, the first sensor information is acquired based on at least one of image data, audio data, temperature data, luminance data, radio frequency data, time data odor data and combinations thereof. The first sensor information may also be based on measurements from an earth magnetic field, a salinity of water, a water current, a water pressure, an air pressure, a sound, an electromagnetic spectrum from man-made or natural sources, as well as known and fixed arrangements thereof.

As discussed above, the first sensor information may include multiple sensor values or sensor measurements. The first sensor information may also include an information about an arrangement of the man-made and/or natural phenomena from which the sensor values are obtained. For example, the first sensor information includes the receiving direction or an estimated position of the man-made and/or natural phenomena from which the sensor values are obtained. The receiving direction or the estimated position may be based on a position of the device receiving the sensor values.

According to an embodiment, the plurality of condition information stored in the knowledge base is used to establish a multi-dimensional map for at least a portion of the environment, wherein the multi-dimensional map assigns a respective or corresponding condition information of the plurality of condition information to each one of a plurality of specified positions within the environment.

The multi-dimensional electronic map may be a virtual or digital map in which different geolocations are assigned to multiple dimensions of sensor data which is represented by the condition information stored in the knowledge base. In particular, the multi-dimensional electronic map may comprise multiple sensor data assigned to a single virtual location of the multi-dimensional electronic map, wherein the single virtual location of the multi-dimensional electronic map represents one or more a respective specified position in the real environment.

According to an embodiment, a machine-learning algorithm is used to provide the knowledge base. The machine-learning algorithm may be based on rules or processes developed by allocating a plurality of sensor information to a plurality of location information.

This means that the rules or processes are learned and established based on already obtained sensor information. These rules or processes may then be used to allocate acquired sensor information to acquired location information, i.e. to generate condition information for a respective specified position. The machine-learning may thus build up the knowledge base. More precisely, the measured data from the different sensors like visual images, radio signals, compass read outs etc. may be used as a training data set together with a known position. In this way, the method and the system described below learns to understand the relationship between a geolocation and its appearance in images (taken from different position/angles at a certain time of the day and the year), and in the various other sensor data.

According to an embodiment, the knowledge base is constantly updated by processing a plurality of condition information received from a plurality of devices.

For example, the information acquisition process to build up and automatically update the knowledge base can be provided using sensor information from multiple different mobile devices such as vehicles like aircraft, ground vehicles, water vehicles, etc. This improves the reliability of the matching between the current sensor information obtained by the device with the condition information stored in the knowledge base since the knowledge base can be kept up to date constantly. Once a significant number of vehicles (so-called swarm approach) uses the localization of the inventive method, the sensor data which the individual vehicles capture for positioning may be used to further train the system in a continuous fashion such that the knowledge database remains up to date and the location performance is increased. In order to do so, vehicles may collect the data which is then processed on ground and the knowledge base is available via (incremental) updates.

According to an embodiment, localizing the device within the environment is further based on a current movement information of the device.

The movement information may be a current velocity and/or acceleration of the device within the environment. Thus, the current position of the device in the environment can be further verified using a plausibility check, wherein the localization, i.e. the determination of the current position, of the device may be checked based on the movement information the device has carried out within a certain time span between the last well known position and the current position. It is also possible that the plausibility check is based on an inertial system. Furthermore, the plausibility check may be only based on a travelling time of the device combined with a velocity of the device which results in a circle or sphere indicating the possible positions to which the device may have moved within the travelling time. In this manner, the space for localizing the device may be limited using the plausibility check.

Besides localizing tasks or navigation tasks, the inventive method may therefore provide plausibility and integrity checks in order to improve and estimate the reliability of other localization methods like for example GNSS.

According to an embodiment, the knowledge base is provided within the device and/or within a stationary facility spatially separated from the device.

If the knowledge base is provided within the stationary facility, the mobile device may wirelessly retrieve the information required for the localization and navigation from the knowledge base in the remote stationary facility. Alternatively, the knowledge base may be provided in the device itself, wherein updates of the knowledge base in the device may be carried out constantly, incrementally or irregularly by a wireless or wired connection for retrieving updates from a remote platform or other devices.

According to an embodiment, the device is a vehicle having a device sensor unit for providing the current sensor information.

The device sensor unit may include a camera, a temperature sensor, an odor sensor, a magnetic field sensor, etc.

According to an aspect of the invention, a system for localizing a device within an environment is provided. The system comprises a processing unit configured to acquire a first location information that is representative for a first specified position within the environment and to acquire first sensor information that is representative for the first specified position within the environment. The processing unit is further configured to allocate the acquired first sensor information to the acquired first location information in order to generate a first condition information that is unique for the first specified position within the environment. The system further includes a storage unit configured to store a knowledge base having stored therein a plurality of condition information comprising at least the first condition information. The processing unit is configured to receive a current sensor information indicating a current condition of an environment present at a current position of a vehicle. Therefore, the system may further include a vehicle configured to acquire the current sensor information indicating a current condition of the environment present at the current position of the vehicle. The system comprises a localization unit configured to provide localization information based on a matching between the current sensor information and the plurality of condition information stored in the knowledge base. Preferably, the system comprises a localization unit configured to localize the vehicle within the environment based on a matching between the current sensor information and the plurality of condition information stored in the knowledge base.

It is noted that the features described with respect to the inventive method, apply analogously to the inventive system.

According to an embodiment, the vehicle is spatially separated from the processing unit and the storage unit, wherein the localization unit receives the current sensor information from the vehicle, and wherein the localization unit receives the plurality of condition information from the storage unit.

According to an embodiment, the system further comprises a plurality of vehicles, wherein each of the plurality of vehicles is configured to acquire a current sensor information indicating a current condition of the environment present at the current position of the respective vehicle. It is possible that each or some of the vehicles comprise a specific type of sensor adapted to obtain sensor information corresponding to this type of sensor, wherein sensor information from different types of sensors can be exchanged between the different vehicles. In this manner, it is possible to reduce the number of sensors each vehicle has to carry and nevertheless provide all required sensor information to one vehicle to be localized.

The localization unit is configured to localize each vehicle of the plurality of vehicles within the environment based on a matching between the current sensor information received from the respective vehicle and the plurality of condition information stored in the knowledge base.

According to an embodiment, the vehicle is a ground vehicle, an aerial vehicle, a water vehicle or a combination thereof.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
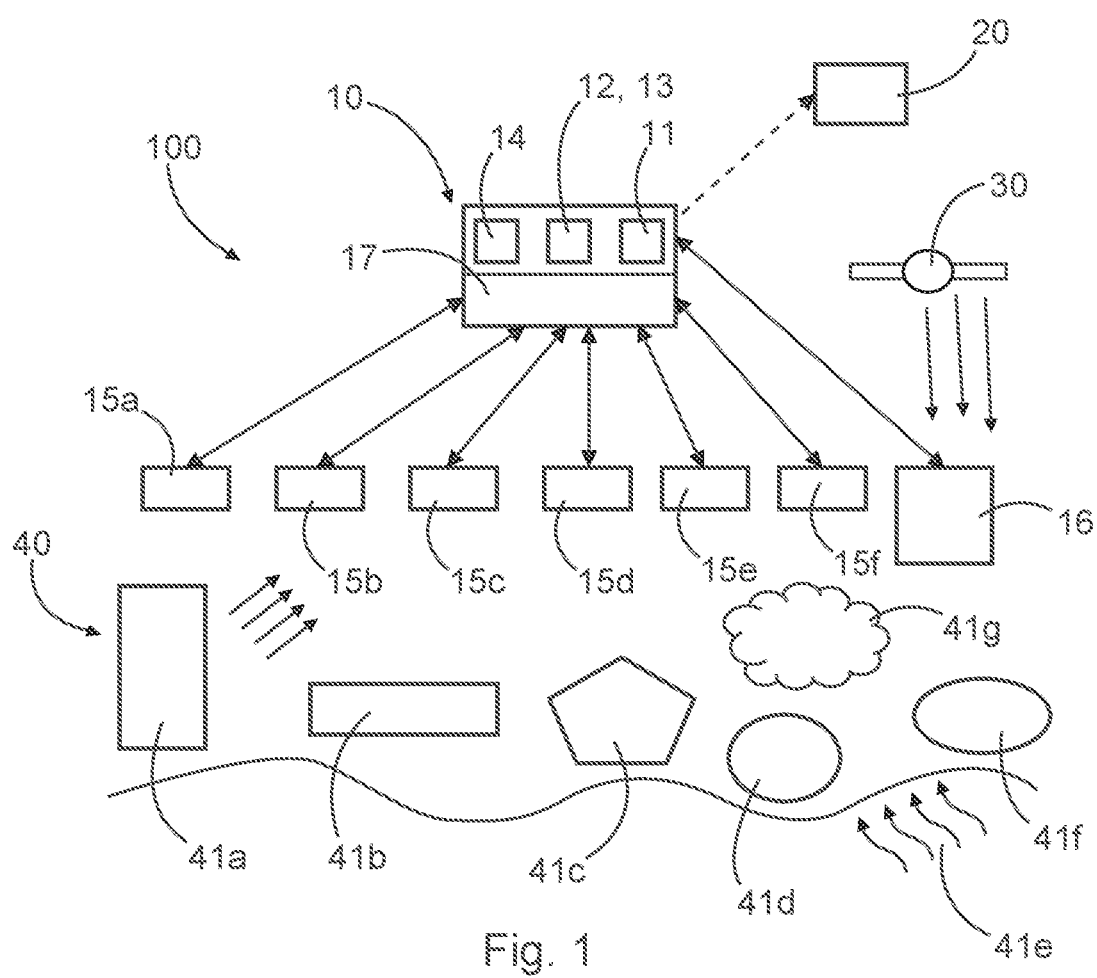
FIG. 1 shows a system architecture of a system for localizing a device within an environment according to an exemplary embodiment.

The representations and illustrations in the drawings are schematic and not to scale. A better understanding of the method and system described above may be obtained through a review of the illustrations accompanying this application together with a review of the detailed description that follows.

FIG. 1 shows a system architecture 100 with a system 10 for localizing a device 20 within an environment 40. The system 10 comprises a processing unit 11 configured to acquire a first location information from the satellite navigation system 30. This location information is acquired or received by position sensor 16, e.g. a GNSS position sensor, and transmitted to processing unit 11. The location information is representative for a first specified position within the environment, for example a position of an information acquisition device which collects the location and sensor data during an information acquisition process which is further described with regard to FIG. 2 below. The location information may define a satellite-based positioning of the information acquisition device within the environment. For example, three-dimensional coordinates may be used to define the first specified position where the location information is collected.

The processing unit 11 is further configured to acquire first sensor information that is representative for the first specified position within the environment 40. This means that each of the sensors 15a, 15b, 15c, 15d, 15e, 15f collect different sensor information at the first specified position where the location information was collected. The collected sensor information is fused, i.e. combined, to provide the first sensor information which is representative, in particular unique, for the first specified position within the environment 40. By collecting the sensor measurements of sensors 15a, 15b, 15c, 15d, 15e, 15f, a plurality of different sensor values may be provided, wherein the combination of these sensor values is descriptive for or indicative of the first specified position within the environment 40 in which the information acquisition process is carried out.

A part of the sensors 15a, 15b, 15c, 15d, 15e, 15f, for example sensors 15a, 15b, 15c, acquire man-made features 41a, 41b, 41c of the environment 40, whereas another part of the sensors 15a, 15b, 15c, 15d, 15e, 15f, for example sensors 15d, 15e, 15f, acquire natural phenomena 41d, 41e, 41f, 41g of the environment 40. The sensors 15a, 15b, 15c, 15d, 15e, 15f may be active and/or passive sensors.

Examples of man-made features may include buildings, streets, traffic signs, radio signals, etc. Man-made features may also include distortions of natural signals based on man-made features, surface mining sites, man-made emissions of specific gases/particles or sounds, crop (seasonal), etc.

Examples of natural phenomena may include appearances in different channels of the neighboring or adjacent landscape, mountains/terrain, trees, earth magnetic field, gravity, etc. Further examples for natural phenomena may include brightness at a certain time of the day and the year at a specified position. Examples of natural phenomena may also include a position of the sun as seen from the earth, a position of the moon or other celestial bodies as seen from the earth, etc.

The first senor information is transmitted to the processing unit 11 for allocation to the first location information. In particular, the processing unit 11 allocates the acquired first sensor information to the acquired first location information in order to generate a first condition information that is represents a unique description of the first specified position within the environment 40. It is possible that the sensor values obtained by the sensors 15a, 15b, 15c, 15d, 15e, 15f include sufficient information that the first specified position can be uniquely described. In particular, the combination of theses sensor values provides a distinct and unambiguous description of the first specified position such that no other specified position within the environment 40 has the same combination of sensor values.

The system 10 further comprises a storage unit 12 for storing a knowledge base 13 having stored therein a plurality of condition information comprising at least the first condition information. The described information acquisition process where the first sensor information is allocated to the first location information to obtain the first condition information for the first specified position is repeated several times, i.e. further location information is allocated to respective further sensor information in order to obtain respective further condition information such that each of the respective further condition information uniquely describes a respective specified position in the environment 40. The resulting plurality of condition information is then stored in the knowledge base 13 which comprises a multi-dimensional electronic map, in which each of the plurality of condition information is stored for a respective one of multiple specified positions.

In this manner, several dimensions, e.g. sensor values describing a respective specified position, are stored for each position in the multi-dimensional electronic map that provides a virtual representation of the environment 40. The system 10 further comprises module 17 having a middle ware, i.e. a software providing software applications to be applied by the processing unit 11. The middle ware translates or encodes the sensor information from sensors 15a, 15b, 15c, 15d, 15e, 15f to a multi-dimensional description of each position in the multi-dimensional electronic map stored in the knowledge base 13.

The system further comprises a device 20, for example a vehicle 20, that acquires a current sensor information from the environment 40, wherein the current sensor information indicates a current condition of the environment 40 present at the current position of the vehicle 20. This current sensor information acquisition may be carried out during a localization process as further explained with regard to FIG. 3 below. The current sensor information acquisition may be carried out constantly during a movement of the vehicle 20. The vehicle 20 receives the knowledge base 13 or parts of the knowledge base 13 or information from the knowledge base 13 which is indicated in FIG. 1 by a dotted line.

The system 10 further comprises a localization unit 14 for localizing the vehicle within the environment 40 based on a matching between the current sensor information and the plurality of condition information stored in the knowledge base 13. In particular, the collected current sensor information of the vehicle 20 is matched against the plurality of condition information stored in the knowledge base 13. If the current condition information which is based on the current sensor information matches with a particular condition information stored in the knowledge base 13 (at least with a certain probability), then the current position of the vehicle 20 can be determined, i.e. the vehicle 20 is localized. Using this localization, the vehicle 20 can be provided with tracking and navigation information to navigate the vehicle 20 through the environment 40.

Figure 2:
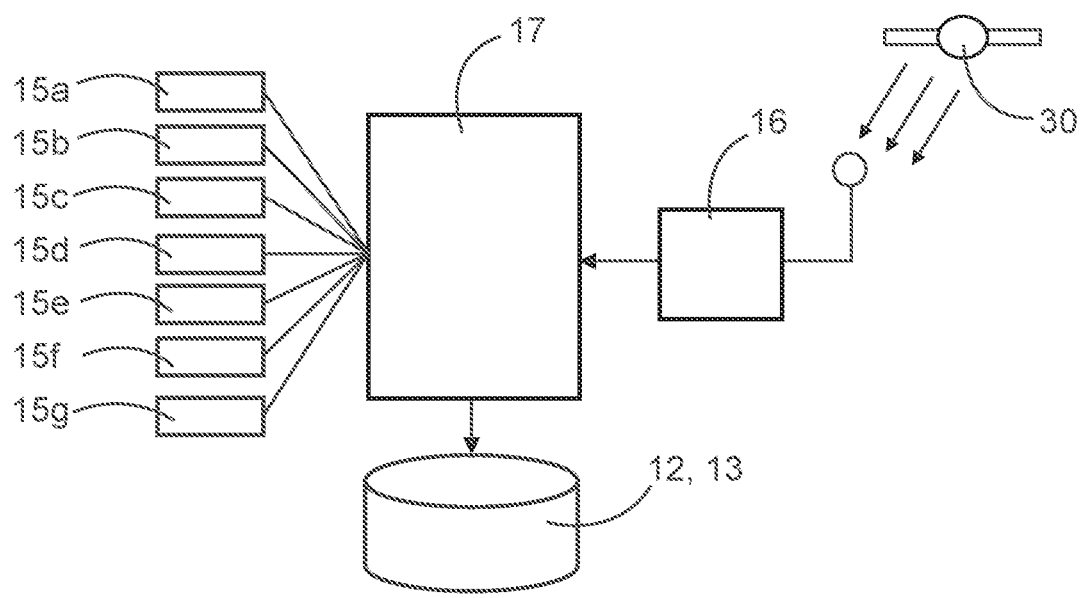
FIG. 2 shows an information acquisition process for a method of localizing a device according to an exemplary embodiment.

FIG. 2 shows an information acquisition process for a method of localizing a device 20 within an environment. The information acquisition process may be limited to building up and updating the knowledge base 13 of the storage unit 12. During the information acquisition process, several sensors 15a, 15b, 15c, 15d, 15e, 15f like camera, electronic compass, software defined radio, gravity sensor, etc. are used to measure associated sensor values of the different man-made and natural features like earth magnetic field, visual topography including buildings, radio frequencies in the environment 40, and a connection between the combination of the measured sensor values as well as a geocoordinate, i.e. the location information from satellite navigation system 30, is calculated. The location information is detected using position sensor 16 which may include a clock for assigning a time reference to the location information.

Using the middle ware in module 17, a multi-dimensional electronical map or data set can be created allowing to describe every location (for example on earth or at least in a city) by the individual and unique combination of the measured sensor values as described with regard to FIG. 1. This multi-dimensional electronical map is stored in the database of storage unit 12 and provides the knowledge base 13.

A machine learning may be applied to the calculation of the combination of the measured sensor values and the geocoordinate to establish the knowledge base 13 which can be deployed and allow robust GNSS independent positioning. The information acquisition process of FIG. 2 may comprise an initial information acquisition process as well as an update process. For the initial setup dedicated measuring campaigns which focus on gapless mapping may be applied. This may include an integrity check of the location information needed. In a later campaign, swarms of (air/road/maritime) vehicles 20 (i.e. users of the localization system) can be used to update the multi-dimensional electronic map in a continuous fashion. In this case, vehicles 20 may collect or downlink the information which is then processed at the processing unit 11. In other words, a plurality of devices 20 or vehicles 20 may contribute to the build-up and/or update of the knowledge base 13.

Once a significant number of vehicles 20 uses the inventive method and/or system 10, the sensor data which the individual vehicles capture for positioning may be used to further train the system in a continuous fashion such that the knowledge database stays up to date and the localization performance is increased. In order to do so, vehicles may collect the data which is then processed on ground and the knowledge data is available via (incremental) updates.

Figure 3:
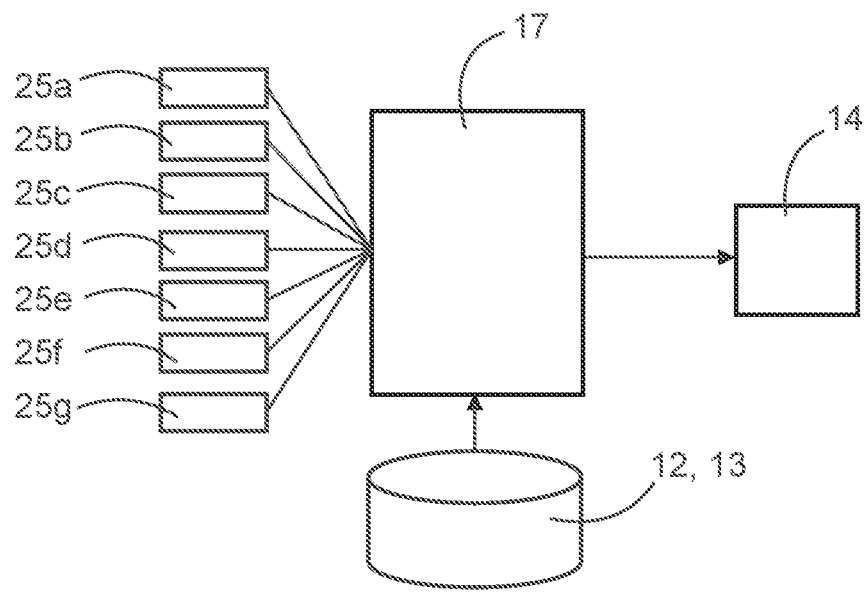
FIG. 3 shows a localization process of a method of localizing a device according to an exemplary embodiment.

FIG. 3 shows the localization process for localizing the device 20 using the knowledge base 13. The sensors 25a, 25b, 25c, 25d, 25e, 25f, 25g of the 20 or vehicle 20 collect the current sensor information that indicate a current condition of the environment 40 currently present or achievable at the current position of the device 20. This current sensor information is transmitted to module 17 which applies a matching software to match the current sensor information against the plurality of condition information stored in the knowledge base 13. Therefore, information from the knowledge base 13 is transmitted from the storage unit 12 to module 17 for matching. The matching may also be carried out by the localization unit 14. The matching results in the localization unit 14 to localize the vehicle 20.

In other words, the localization of the vehicle 20 is based on calculating a position or positions by comparing database entries with current sensor data. This step may include a filtering, e.g. a Kalman filtering, of the sensor information and stored condition information. In particular, a Kalman filtering may be applied in order to stabilize the localization results especially in cases where one of the features or phenomena measured is incorrect, unprecise or not reliable anymore.

Figure 4:
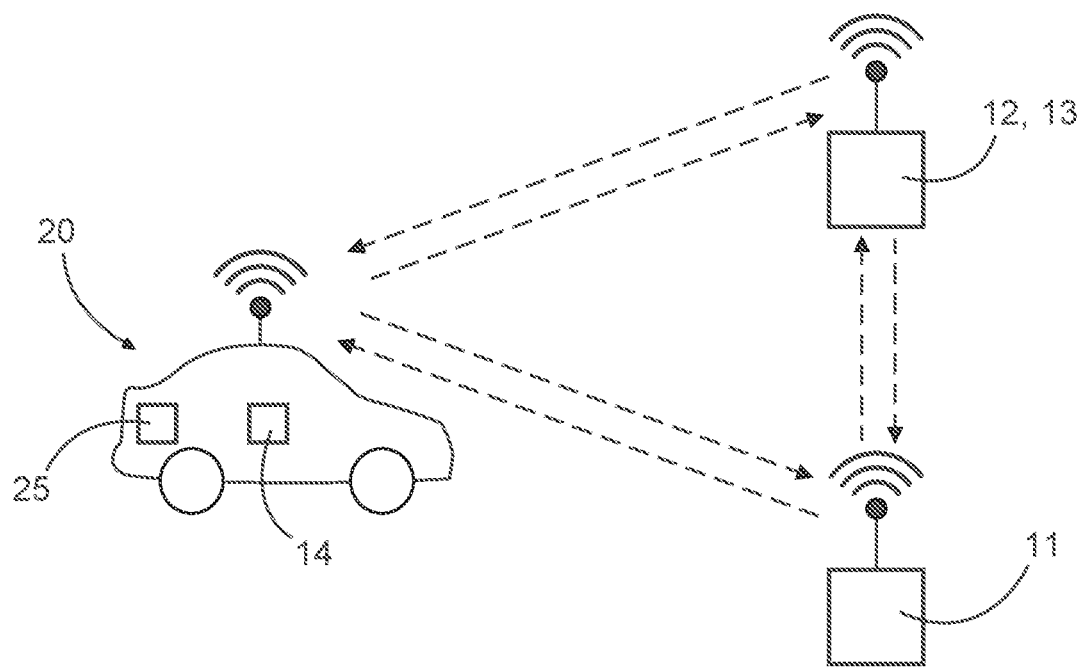
FIG. 4 shows an information transfer between components of the system for localizing a device according to an exemplary embodiment.

FIG. 4 shows an information transfer between components of the system architecture 100 for localizing the device 20, e.g. the vehicle 20. The vehicle 20 is spatially separated from the processing unit 11 and the storage unit 12. The processing unit 11 and/or the storage unit 12 may be located in a stationary facility.

The localization unit 14 which receives the current sensor information from a vehicle sensor unit 25 and the plurality of condition information from the storage unit 12, i.e. knowledge base 13, may also be located spatially separated from the vehicle 20 such that only the navigation information which is based on the localization information is transmitted to the vehicle 20 to navigate the vehicle 20. However, it is possible that the localization unit 14 is located on-board the vehicle 20 as shown in the example of FIG. 4. The vehicle 20 may be a ground vehicle, an aerial vehicle, a water vehicle or a combination thereof.

It is noted that, although FIG. 4 shows the inventive system 10 with only one vehicle 20, it is understood that the system 10 may further comprise a plurality of vehicles 20, wherein each of the plurality of vehicles 20 is configured to acquire current sensor information indicating a respective current condition of the environment 40 present at the current position of the respective vehicle 20 or exchange certain sensor information with other vehicles. Accordingly, a central or stationary localization unit 14 is configured to localize each vehicle 20 of the plurality of vehicles 20 within the environment 40 based on a matching between the current sensor information received from the respective vehicle 20 and the plurality of condition information stored in the knowledge base 13 as described with regard to the localization process illustrated in FIG. 3.

Figure 5:
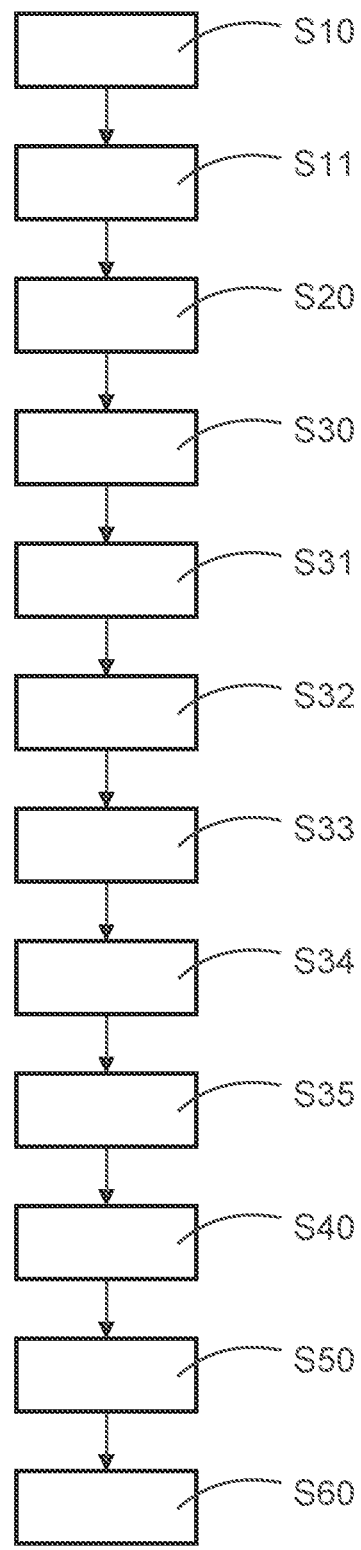
FIG. 5 shows a flow diagram for a method of localizing a device according to an exemplary embodiment.

FIG. 5 shows a flow diagram for a method of localizing a device 20 within an environment 40. In a step S10 of the method, a first location information is acquired that is representative for a first specified position within the environment. In another step S20, a first sensor information is acquired that is representative for the first specified position within the environment. In another step S30, the acquired first sensor information is allocated to the acquired first location information in order to generate a first condition information that is unique or representative for the first specified position within the environment. In another step S40, a knowledge base 13 is provided, the knowledge 13 base having stored therein a plurality of condition information comprising at least the first condition information. In another step S50, the device 20 provides a current sensor information indicating a current condition of the environment present at the current position of the device 20. In another step S60, the device 20 is localized and/or navigated within the environment 40 based on a matching between the current sensor information and the plurality of condition information stored in the knowledge base 13.

In another step S11 the first location information is acquired using data from a satellite navigation system.

In another step S31, the plurality of condition information stored in the knowledge base 13 is provided by allocating a plurality of sensor information to a plurality of respective location information, wherein each one of the plurality of condition information is unique for a respective specified position within the environment 40.

In another step S32, a reliability value is provided that is indicative of a reliability with which the acquired first sensor information corresponds to the acquired first location information.

In another step S33, the plurality of condition information stored in the knowledge base 13 is used to establish a multi-dimensional map for at least a portion of the environment, wherein the multi-dimensional map electronically assigns one condition information of the plurality of condition information to each one of a plurality of specified positions within the environment.

In another step S34, a machine-learning algorithm is used to provide the knowledge base 13, wherein the machine-learning algorithm is based on rules or processes developed by allocating a plurality of sensor information to a plurality of location information.

In another step S35, the knowledge base 13 is updated by processing a plurality of condition information received from a plurality of devices.

It is understood that the above-mentioned method steps may be carried out in the above-listed order or in any different order.

As may be derived from the above, the inventive method and/or system 10 provides to understand a location based on the unique combination of several sensations (visual impression, smell, sound . . . ) but uses more and/or other sensors. The method and/or system 10 uses a machine-learning approach to understand the relationship between the different features or phenomena and a location rather than or in addition to an algorithm to reference one feature exactly to a specific coordinate (e.g. a corner of the building has coordinates x, y, z) and then tries to find exactly this specific feature to calculate the location of the vehicle.

In this manner, the inventive method and/or system 10 is very robust and a spoofing or jamming does not affect the performance of localization. The method and/or system 10 improves by self-learning in a swarm approach and may also be used to detect errors or low integrity in GNSS signals or other positioning systems. Furthermore, the method and/or system 10 can work in different environments and for different types of vehicles (autonomous cars, UAVs, etc.)

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims. Additionally, it is noted that "comprising" or "including" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of localizing a device within an environment, the method comprising:
    acquiring a first location information that is representative of a first specified position within the environment;
    acquiring a first sensor information that is representative of the first specified position within the environment;
    allocating the acquired first sensor information to the acquired first location information to generate a first condition information that is unique for the first specified position within the environment;
    providing a knowledge base having stored therein a plurality of condition information comprising at least the first condition information;
    using the plurality of condition information stored in the knowledge base to establish a multi-dimensional map for at least a portion of the environment, wherein the multi-dimensional map assigns one condition information of the plurality of condition information to each one of a plurality of specified positions within the environment;
    providing, by the device, a current sensor information indicating a current condition of the environment present at the current position of the device; and
    localizing the device within the environment based on a matching between the current sensor information and the plurality of condition information stored in the knowledge base.

2. The method of claim 1, further comprising:
    providing the plurality of condition information stored in the knowledge base by allocating a plurality of sensor information to a plurality of respective location information, wherein each one of the plurality of condition information is unique for a respective specified position within the environment.

3. The method of claim 2, wherein at least one sensor information is allocated to each one of the plurality of acquired location information, and
wherein the at least one sensor information and the allocated location information are representative for a respective one of a plurality of specified positions in the environment.

4. The method according to claim 1, further comprising: acquiring the first location information using data from a satellite navigation system.

5. The method according to claim 1, further comprising: providing a first reliability value that is indicative of a reliability with which the acquired first sensor information corresponds to the acquired first location information;
wherein the acquired first sensor information is allocated to the acquired first location information only if the first reliability value exceeds a reliability threshold value.

6. The method according to claim 1, wherein the first sensor information comprises a qualitative sensor information and a quantitative sensor information,
wherein the quantitative sensor information is allocated to the qualitative sensor information.

7. The method according to claim 1, wherein the first condition information is representative of an appearance of an object, wherein the appearance of the object is unique for the first specified position within the environment.

8. The method according to claim 1, further comprising: using a machine-learning algorithm to provide the knowledge base, wherein the machine-learning algorithm is based on rules developed by allocating a plurality of sensor information to a plurality of location information.

9. The method according to claim 1, further comprising: updating the knowledge base by processing a plurality of condition information received from a plurality of devices.

10. The method according to claim 1, wherein localizing the device within the environment is further based on a current movement information of the device.

11. A system for localizing a device within an environment, comprising:
a processing unit configured to acquire a first location information that is representative of a first specified position within the environment;
wherein the processing unit is configured to acquire a first sensor information that is representative of the first specified position within the environment;
wherein the processing unit is configured to allocate the acquired first sensor information to the acquired first location information to generate a first condition information that is unique for the first specified position within the environment;
a storage unit configured to store a knowledge base having stored therein a plurality of condition information comprising at least the first condition information;
a vehicle configured to provide a current sensor information indicating a current condition of the environment present at the current position of the vehicle; and
a localization unit configured to localize the vehicle within the environment based on a matching between the current sensor information and the plurality of condition information stored in the knowledge base,
wherein the plurality of condition information stored in the knowledge base is used to establish a multi-dimensional map for at least a portion of the environment, wherein the multi-dimensional map assigns one condition information of the plurality of condition information to each one of a plurality of specified positions within the environment.

12. The system of claim 11,
wherein the vehicle is spatially separated from the processing unit and the storage unit,
wherein the localization unit is configured to receive the current sensor information from the vehicle; and
wherein the localization unit is configured to receive the plurality of condition information from the storage unit.

13. The system of claim 11, further comprising:
a plurality of vehicles, wherein each of the plurality of vehicles is configured to acquire a current sensor information indicating a current condition of the environment present at the current position of the respective vehicle;
wherein the localization unit is configured to localize each vehicle of the plurality of vehicles within the environment based on a matching between the current sensor information received from the respective vehicle and the plurality of condition information stored in the knowledge base.

14. The system of claim 11, wherein the vehicle is a ground or underground vehicle, an aerial vehicle, a water or underwater vehicle or a combination thereof.

* * * * *